United States Patent [19]

Akiyama

[11] Patent Number: 5,477,751
[45] Date of Patent: Dec. 26, 1995

[54] CLUTCH ASSEMBLY FOR AN AUTOMATIC TRANSMISSION

[75] Inventor: Masaya Akiyama, Fuji, Japan

[73] Assignee: Jatco Corporation, Fuji, Japan

[21] Appl. No.: 197,947

[22] Filed: Feb. 17, 1994

[51] Int. Cl.⁶ .................................... F16H 57/02
[52] U.S. Cl. .................. 74/606 R; 192/109 R; 192/112; 475/146
[58] Field of Search ............... 192/48.3, 48.92, 192/85 AA, 109 R, 112; 475/146, 148; 74/606 R

[56] References Cited

U.S. PATENT DOCUMENTS

| | | | |
|---|---|---|---|
| 2,766,864 | 10/1956 | Schilling et al. | 192/85 AA X |
| 4,716,787 | 1/1988 | Miura et al. | 475/146 |
| 5,186,693 | 2/1993 | Nishida et al. | 475/148 |
| 5,335,763 | 8/1994 | Katoh | 192/85 AA |

FOREIGN PATENT DOCUMENTS

| | | | |
|---|---|---|---|
| 60-84469 | 5/1985 | Japan. | |
| 2-89870 | 3/1990 | Japan | 192/85 AA |

*Primary Examiner*—Richard M. Lorence
*Attorney, Agent, or Firm*—Foley & Lardner

[57] ABSTRACT

A clutch assembly for an automatic transmission comprises a side cover housing defining one part of an annular hollow space, a rotary member arranged inside of the annular hollow space defined by the side cover housing, at least one clutch plate axially movably engaged with the side cover housing, at least one second clutch plate axially movably engaged with the rotary member, and a piston arranged in the annular hollow space for thrusting the first and second clutch plates in the axial direction. A cover member is arranged adjacent to the side cover housing while defining the other part of the annular hollow space, and a part of the side surface of the cover member comes in contact with either one of the first and second clutch plates so as to restrict the axial displacement of the same therewith.

5 Claims, 2 Drawing Sheets

CLUTCH ASSEMBLY FOR AN AUTOMATIC TRANSMISSION

BACKGROUND OF THE INVENTION

1. Field of the Invention

The present invention relates generally to an automatic transmission. More particularly, the present invention relates to a clutch assembly for an automatic transmission which serves as a kind of engaging/disengaging unit.

2. Description of the Related Art

A typical conventional clutch assembly of the foregoing type is disclosed in an official gazette of Japanese Patent Application Laying-Open No. 60-84469.

According to this prior art, the clutch assembly includes as essential components clutch plates, a housing for supporting the clutch plates operatively associated therewith, a piston for thrusting the clutch plates, and a concentric stop ring (serving as displacement restricting means) disposed at a predetermined position for restricting the axial displacement of the clutch plates.

With the conventional clutch assembly constructed in the above-described manner, however, since the axial displacement of the clutch plates is restricted by the concentric stop ring, there arises a necessity for additionally maintaining an axial space by a quantity corresponding to the arrangement of the concentric stop ring. This leads to the result that the kind of components constituting the clutch assembly is increased, and moreover, an assembling operation to be achieved for the concentric stop ring requires many manhours.

SUMMARY OF THE INVENTION

The present invention has been made in consideration of the aforementioned background.

An object of the present invention is to provide a clutch assembly for an automatic transmission which assures that the hollow space of the clutch assembly as measured in the axial direction can be shortened, and the number of components constituting the clutch assembly can be reduced.

Another object of the present invention is to provide a clutch assembly of the foregoing type which assures that manhours required for achieving an assembling operation for the concentric stop ring of the conventional clutch assembly can be eliminated.

According to one aspect of the present invention, there is provided a clutch assembly for an automatic transmission, comprising;

a first member defining one part of an annular hollow space, a second member arranged inside of the annular hollow space defined by the first member, at least one first clutch plate axially movably engaged with the first member, at least one second clutch plate axially movably engaged with the second member, a piston arranged in the annular hollow space for thrusting the first and second clutch plates in the axial direction, and a cover member arranged adjacent to the first member to define the other part of the annular hollow space, a part of the side surface of the cover member coming in contact with either one of the first and second clutch plates so as to restrict the axial displacement of the same therewith.

Here, the automatic transmission may comprise a transmission housing in which a main speed changing unit arranged along a first axis and an auxiliary speed changing unit arranged along a second axis extending in parallel with the first axis are received, and a side cover for closing an opening portion formed through the transmission housing therewith. In this case, the opening portion of the transmission housing is oriented in the axial direction.

It is desirable that the cover housing serves as a first member for the clutch assembly.

In practice, the second member is prepared in the form of a bracket fixedly secured to a rotational shaft of the auxiliary speed changing unit.

To assure rigidity of the clutch assembly, the outer peripheral part of the cover member may be fitted into the first member, i.e., the cover housing.

According to other aspect of the present invention, plural kinds of cover members each having a different thickness at a part of the side surface thereof to serve as a stopper surface are preliminarily prepared in consideration of conveniences at the time of practical use, and one of them is selected corresponding to a predetermined clutch clearance required at the time of practical use of the clutch assembly.

For the same purpose as mentioned above, the outer peripheral part of the cover member is fitted into the side cover housing so that it is held between the transmission housing and the side cover housing in the clamped state.

It is desirable that the cover member is formed integral with a bearing supporting member for rotatably supporting an input gear of the auxiliary speed changing unit.

When the automatic transmission is assembled with the clutch assembly of the present invention, the opening portion of the transmission housing assembled with a piston and clutch plates is covered with the cover member.

As the clutch piston is actuated, the clutch plates are thrusted by the clutch piston but the axial displacement of the clutch plates caused by the foregoing thrusting thereof is restricted by the side surface of the cover member.

Since plural kinds of cover members are preliminarily prepared in that way, an optimum side cover is selected from among them, causing the position of a part of the side surface of the cover member relative to the housing to vary depending on a thickness of the selected cover member, whereby the clutch clearance can adequately be adjusted. The foregoing part of the side surface of the cover member serves as a stopper surface for the clutch assembly as mentioned above.

The above and other objects, effects, features and advantages of the present invention will become more apparent from the following description of embodiments thereof taken in conjunction with the accompanying drawings.

BRIEF DESCRIPTION OF THE DRAWINGS

The present invention is illustrated in the following drawings in which.

DESCRIPTION OF THE PREFERRED EMBODIMENT

The present invention will now be described in detail hereinafter with reference to the accompanying drawings which illustrate a preferred embodiment thereof.

Figure 2:
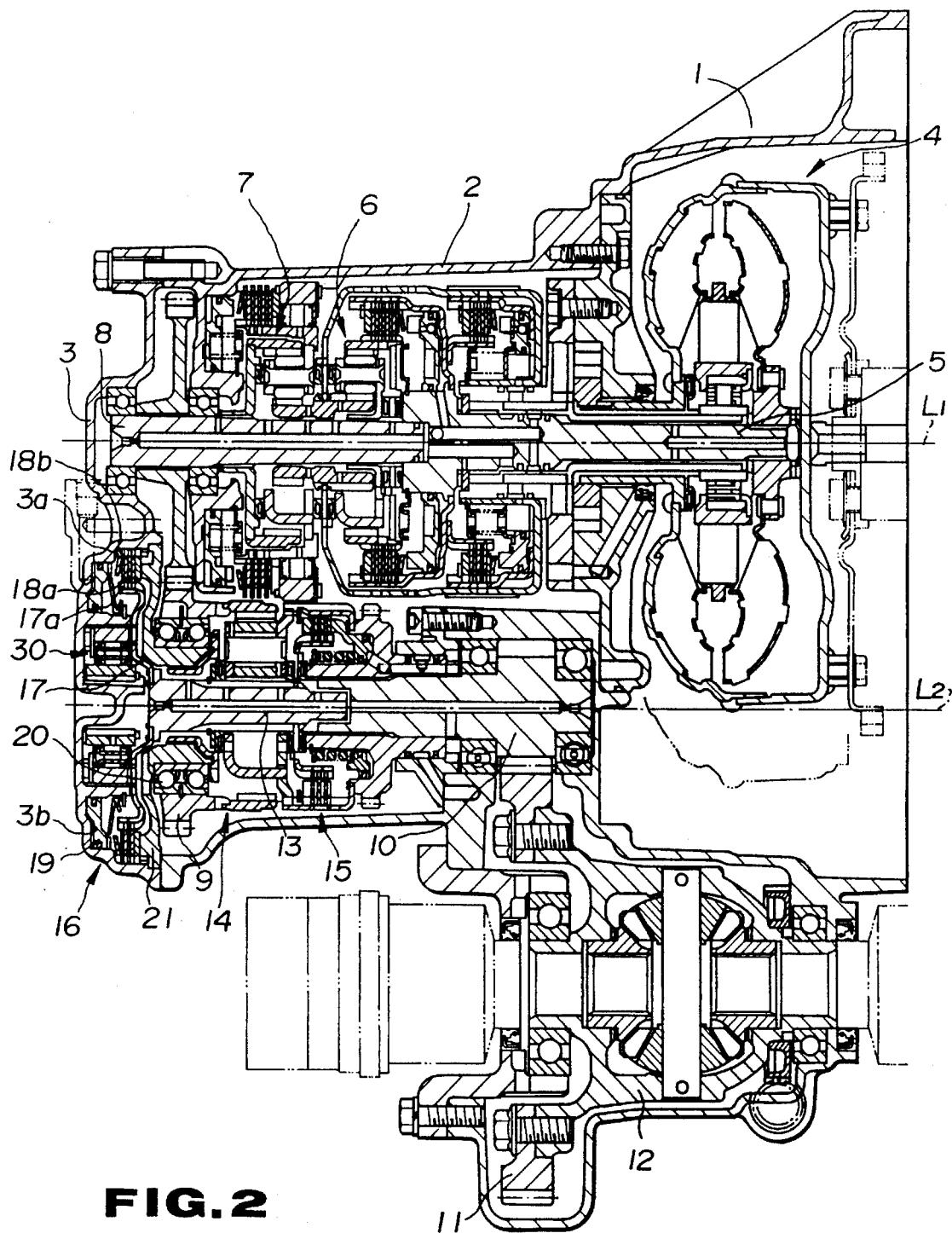
FIG. 2 is a sectional view of an automatic transmission applied with the clutch assembly according to the present invention, particularly showing the whole structure of the automatic transmission.

FIG. 2 shows by way of sectional view the whole structure of an automatic transmission for which a clutch assembly constructed according to an embodiment of the present invention is employed.

In the shown case, the automatic transmission includes a main speed changing unit arranged along a first axis L1 and an auxiliary speed changing unit arranged along a second axis L2 extending in parallel with the first axis L1. In FIG. 2, reference numeral 1 designates a converter housing in which a torque converter 4 arranged on the first axis L1 is received, and reference numeral 2 designates a transmission housing connected to the converter housing 1. The main speed changing unit and the auxiliary speed changing unit are received in the transmission housing 2. An opening portion formed through the transmission housing 2 in the axial direction is covered with a side cover housing 3. Reference numeral 5 designates an input shaft operatively connected to a turbine of the torque converter 4, reference numeral 6 designates a front planetary unit, and reference numeral 7 designates a rear planetary unit. The speed of an output shaft 8 can arbitrarily be changed by changing power transmission of both the front planetary unit 6 and the rear planetary unit 7. The rotational power of the output shaft 8 is outputted to an output gear 8A of the main speed changing unit operatively engaged with the output shaft 8. Reference numeral 9 designates an idle gear meshing with the output gear 8A to serves as an input gear of the auxiliary speed changing unit, reference numeral 10 designates a pinion reduction gear which serves as an output gear of the auxiliary speed changing unit, reference numeral 11 designates a final gear, and reference numeral 12 designates a differential.

An intermediate shaft 13 is arranged in the coaxial relationship relative to the pinion reduction gear 10 while extending along the axis L2, and a reduction planetary gear unit 14 is provided on the intermediate shaft 13. The auxiliary speed changing unit is operated by changing the reduction planetary gear unit 14 so that four speeds forward is attained in cooperation with the main speed changing unit having three speeds forward.

In addition, a direct clutch 15 and a reduction brake 16 are mounted on the intermediate shaft 13. The reduction brake 16 is an embodiment of the clutch assembly according to the present invention. Specifically, the reduction brake 16 includes as essential components clutch plates 18a which are axially movably supported on a spline portion 17a of a bracket 17 connected to one end of the intermediate shaft 13, clutch plates 18b which are axially movaly supported on a spline portion 3a formed in the side cover housing 3, and a piston 19 received in a piston chamber 3b formed inside of the side cover housing 3 so as to thrust the clutch plates 18a and 18b therewith. The side cover housing 3 defines a part of a first annular hollow space including the axis L2 of the auxiliary speed changing unit as a center as well as a part of a second annular hollow space having a diameter larger than that of the first annular hollow space. An one-way clutch 30 is arranged in the first annular hollow space, while the reduction brake 16 is arranged in the second annular hollow space. An inner race 30a of the one-way clutch 30 is spline-connected to the side cover housing 3, and an outer race 30b of the same is secured to the bracket 17. In addition, a cover member 21 formed integral with a bearing supporting member is arranged between the reduction brake 16 and the idler gear 9, and the bearing supporting member serves to rotatably support the idler gear 9 via a bearing 20.

Figure 1:
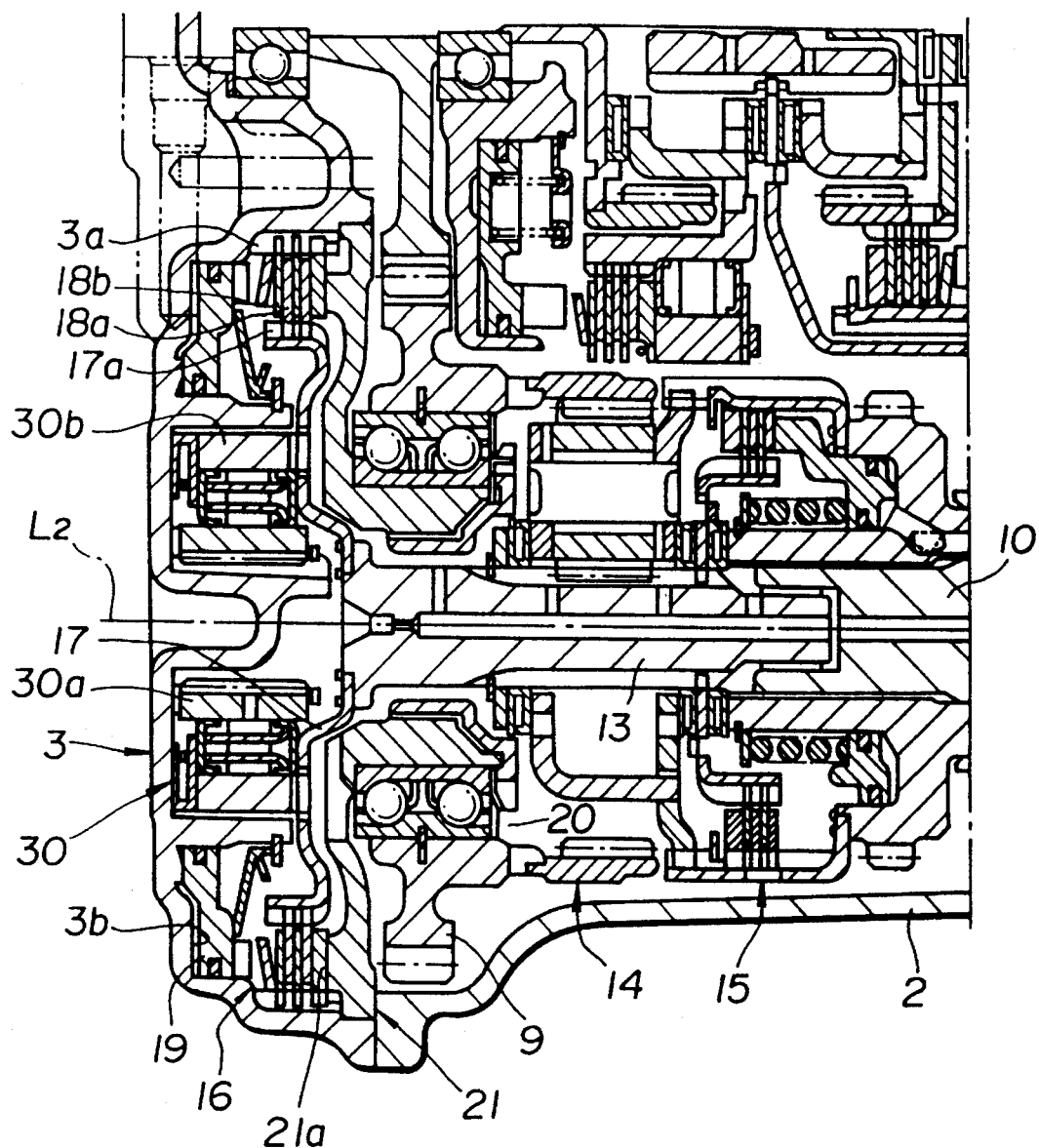
FIG. 1 is a fragmentary enlarged sectional view of a clutch assembly for an automatic transmission constructed according to an embodiment of the present invention, particularly showing essential components constituting the clutch assembly.

As shown in FIG. 1 (i.e., a fragmentary enlarged sectional view of FIG. 2), the cover member 21 is designed in the cover-shaped configuration so as to close at least the second annular hollow space of the side cover housing 3 therewith, and the outer peripheral part of the cover member 21 is fitted into the side cover housing 3 while it is held between the transmission housing 2 and the side cover housing 3 in the clamped state. In detail, the cover member 21 is firmly clamped between the transmission housing 2 and the side cover housing 3 with a high intensity of tightening force enough to secure the side cover housing 3 to the transmission housing 2 by tightening a plurality of bolts (not shown).

As shown in FIGS. 1 and 2, the side surface of the cover member 21 in the vicinity of the outer peripheral edge is arranged in such a manner as to come in contact with the clutch plate 18b. In the shown case, a part of the surface of the cover member 21 coming in contact with the clutch plate 18b is hereinafter referred to as a stopper surface 21a. In practice, the cover member 21 is constructed such that a part of the cover member 21 corresponding to the stopper surface 21a located around the outer peripheral edge of the cover member 21 has a thickness different from that of the remaining part of the same, and in consideration of conveniences at the time of practical use, plural kinds of cover members 21 each including a stopper surface 21a located at a different position relative to the side cover housing 3 and the transmission housing 2 in the assembled state are prepared. Thus, at the time of practical use, one of the plural kinds of cover members 21 is selected for use in consideration of a predetermined clutch clearance to be described later.

Next, a mode of operation of the clutch assembly constructed in the aforementioned manner will be described below.

a) At the time of assembling:

When the clutch assembly or the reduction brake 16 is assembled with the, first, the side cover housing 3 is assembled with the piston 19, the clutch plates 18a and 18b and associated components, and subsequently, the spline portion 17a of the bracket 17 connected to the end part of the intermediate shaft 13 is fitted to the clutch plate 18a. Thereafter, the side cover housing 3 is assembled with the cover member 21 in such a manner as to close the side cover housing 3 with the cover member 21.

The side cover housing 3 is firmly secured to the transmission housing 2 by tightening a plurality of bolts (not shown), whereby the cover member 21 is held between the side cover housing 3 and the transmission housing 2 in the clamped state.

In the case that the clutch assembly is assembled with the cover member 21 formed integral with a bearing supporting member, an optimum cover member 21 is selected from among the foregoing plural kinds of cover members each including a stopper surface 21a having a different thickness corresponding to a predetermined clutch clearance. In other words, since the clutch clearance is determined depending on the relative position of the stopper surface 21a relative to the side cover housing 3, a desired clutch clearance can be determined by selecting a stopper surface 21a having a predetermined thickness from among the aforementioned plural kinds of stopper surfaces 21a each having a different thickness.

b) At the time of actuation of the piston:

When the piston 19 is actuated to be displaced in the rightward direction as seen in the figures, the clutch plates 18a and 18b are thrusted by the piston 19 so that they come in close contact with each other in the operatively engazed state. At this time, the axial displacement of the clutch plates 18a and 18b is restricted by the stopper surface 21a of the cover member 21.

As is apparent from the above description, in this embodiment, since the clutch plates 18a and 18b of the reduction brake 16 are axially restricted by the cover member 21 formed integral with the bearing supporting member arranged in the automatic transmission for supporting the bearing 20, there does not arise a necessity for individually preparing displacement restricting means such as a concentric stop ring or the like as described above with respect to the conventional clutch assembly. Consequently, an advantageous effect of the present invention is that the number of components constituting the clutch assembly and the number of manhours required for achieving an assembling operation for clutch assembly can be reduced. Another advantageous effect is that a space required for arranging the foregoing component, i.e., the concentric stop ring can be eliminated with the result that the axial dimension of the reduction brake 16 can be reduced.

While the present invention has been described above with respect to a single preferred embodiment thereof, it should of course be understood that the present invention should not be limited only to this embodiment but various designing change or modification may be made without any departure from the scope of the present invention, and it should be construed that the foregoing designing change or modification falls under the scope of the present invention as defined by the appended claims.

For example, in the aforementioned embodiment, the cover member 21 formed integral with the bearing supporting member for supporting the bearing 20 is shown in the form of a cover member. However, the present invention should not be limited only to a cover member of the foregoing type.

In addition, the structure of the clutch assembly should not be limited only to that of the reduction brake described above with reference to the figures which illustrates a preferred embodiment of the present invention.

What is claimed is:

1. An automatic transmission with a clutch assembly, comprising:

a transmission housing in which a main speed changing unit arranged along a first axis and an auxiliary speed changing unit arranged along a second axis extending in parallel with said first axis are received, a side cover housing, defining a part of an annular hollow space, for closing an opening portion formed through said transmission housing therewith, said opening portion being oriented in the axial direction, a member arranged inside of said annular hollow space defined by said side cover housing, at least one first clutch plate axially movably engaged with said side cover housing, at least one second clutch plate axially movably engaged with said member, a piston arranged in said annular hollow space for thrusting said first and second clutch plates in the axial direction, and a cover member arranged adjacent to said side cover housing to define another part of said annular hollow space, a part of a side surface of said cover member coming in contact with either one of said first and second clutch plates so as to restrict the axial displacement of the same therewith, an outer peripheral part of said cover member being fitted into said side cover housing so that it is held between said transmission housing and said side cover housing in a clamped state.

2. An automatic transmission with a clutch assembly, as claimed in claim 1, wherein said member is prepared in the form of a bracket fixedly secured to a rotational shaft of said auxiliary speed changing unit.

3. An automatic transmission with a clutch assembly as claimed in claim 1, wherein the outer peripheral part of said cover member is fitted into said side cover housing.

4. An automatic transmission with a clutch assembly as claimed in claim 1, wherein said cover member is a cover member selected from the group consisting of plural kinds of cover members each having said part of the side surface of said cover member located at a different position relative to the side cover housing and the transmission housing, in an assembled state.

5. An automatic transmission with a clutch assembly as claimed in claim 1, wherein said cover member is formed integral with a bearing supporting member for rotatably supporting an input gear of said auxiliary speed changing unit.

* * * * *